(12) United States Patent
Lee et al.

(10) Patent No.: US 9,540,048 B2
(45) Date of Patent: Jan. 10, 2017

(54) PANEL WITH PATTERN BLOCK BEAD FOR CAR BODY

(71) Applicants: HYUNDAI MOTOR COMPANY, Seoul (KR); KIA MOTORS CORPORATION, Seoul (KR)

(72) Inventors: Moon Seop Lee, Yongin-si (KR); Byoung Hoon Kim, Bucheon-si (KR); Jang Won Hong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/872,088

(22) Filed: Sep. 30, 2015

(65) Prior Publication Data
US 2016/0129856 A1    May 12, 2016

(30) Foreign Application Priority Data
Nov. 12, 2014  (KR) .................. 10-2014-0156844

(51) Int. Cl.
*B62D 25/14*    (2006.01)
*B62D 25/20*    (2006.01)

(52) U.S. Cl.
CPC ............. *B62D 25/14* (2013.01); *B62D 25/20* (2013.01)

(58) Field of Classification Search
CPC ................................ B62D 25/20; G10K 11/16

USPC .......... 296/39.3, 1.03, 204, 193.07; 181/208, 181/207
See application file for complete search history.

(56) References Cited

U.S. PATENT DOCUMENTS

| 3,851,724 | A | * | 12/1974 | Banks, Jr. | ............. E04B 1/8409 181/208 |
| 7,134,710 | B2 | * | 11/2006 | Kamura | ................. B62D 25/20 296/1.03 |
| 2006/0163914 | A1 | | 7/2006 | Kamura et al. | |
| 2013/0095343 | A1 | | 4/2013 | Arsene et al. | |

FOREIGN PATENT DOCUMENTS

| JP | 1997-202269 | | 8/1997 |
| JP | 2004-001668 | A | 1/2004 |
| JP | 2004-255983 | A | 9/2004 |
| JP | 2011-110983 | A | 6/2011 |
| JP | 2011-230174 | A | 11/2011 |
| JP | 2012-081474 | A | 4/2012 |
| KR | 10-2000-0016791 | A | 3/2000 |
| KR | 10-2005-0087320 | A | 8/2005 |

* cited by examiner

*Primary Examiner* — Dennis H Pedder
(74) *Attorney, Agent, or Firm* — McDermott Will & Emery LLP

(57) ABSTRACT

A panel with pattern block bead for a car body includes a plurality of beads. The panel is divided into four division panels by a first substantially horizontal reference line and a first substantially vertical reference line each passing through a center of the panel. One of the beads is formed at a center of each of the division panels.

6 Claims, 4 Drawing Sheets

PANEL WITH PATTERN BLOCK BEAD FOR CAR BODY

CROSS-REFERENCE TO RELATED APPLICATION

This application claims under 35 U.S.C. §119(a) the benefit of priority to Korean Patent Application No. 10-2014-0156844 filed Nov. 12, 2014, the entire contents of which are incorporated herein by reference.

TECHNICAL FIELD

The present disclosure relates to a panel with pattern block bead for car body. More particularly, it relates to a technology which can secure NVH (Noise Vibration Harshness) quality by applying the pattern block bead to a car body floor panel.

BACKGROUND

In general, a car body panel, for example, a center floor panel can satisfy a NVH (Noise Vibration Harshness) performance which is an item characteristic of habitability and comfort of a car only when the car body panel has a structure which can secure a rigidity as well as properly interrupt a noise entering a room.

The center floor panel is installed on a bottom of a middle portion in the car body, and has a structure which increases panel rigidity as well as interrupts the noise entering the room by forming at a regular interval a rigidity increasing foaming on the center floor panel constructed in one piece, and by attaching a pad on the center floor panel or carrying out a rust preventing coating treatment.

FIG. 1 shows a conventional center floor panel such as a curved panel structure having double curvatures, an embo panel structure, and a general bead structure.

However, the conventional structure was an efficient structure in the low frequency area but had a disadvantage in the intermediate frequency area and the high frequency area.

This structure had to apply a vibration reduction material to improve the intermediate frequency performance and the high frequency performance, thereby having a disadvantage in view of weight and cost.

Therefore, there is a need for an optimized structure preferable in view of weight and cost by minimizing the amount of application of vibration reduction material while securing the NVH performance not only in the low frequency area but also in the intermediate frequency area and the high frequency area.

Technologies which are background of the present invention are disclosed in Japanese laid-open patent publication Hei 9-202269, US laid-open patent publication 2006-163914, Japanese laid-open patent publication 2011-130174, and Japanese laid-open patent publication 2004-255983.

The above information disclosed in this Background section is only for enhancement of understanding of the background of the invention and therefore it may contain information that does not form the prior art that is already known in this country to a person of ordinary skill in the art.

SUMMARY

Therefore, the present invention has been devised in regard of above-mentioned facts, and has an object to provide a panel with pattern block bead for car body which can secure an NVH performance not only in the low frequency area but also in the intermediate frequency area and the high frequency area and is favorable in view of weight and cost by implementing a new car body NVH improving structure which can secure a performance equivalent to or more excellent than a conventional curved panel structure having double curvatures in the low frequency area and at the same time secure the intermediate frequency performance and the high frequency performance by arranging bead patterns at a flat plate favorable in the intermediate frequency area and the high frequency area.

The panel with pattern block bead for a car body provided by embodiments of the present invention to achieve the above-mentioned object has the following characteristics:

The panel with pattern block bead for a car body includes a plurality of beads. The panel is divided into four division panels by a first substantially horizontal reference line and a first substantially vertical reference line each passing through a center of the panel. One of the beads is formed at the center of each division panel.

In certain embodiments, another of the beads may be formed at an intersection of the first substantially horizontal reference line and the first substantially vertical reference line.

In certain embodiments, one of the division panels may be divided into nine sub division panels by two parallel second substantially horizontal reference lines dividing substantially equally a width of the division panel into three substantially horizontal sections and two parallel second substantially vertical reference lines dividing substantially equally a length of the division panel into three substantially vertical sections. The size of the one of the beads formed at the center of one of the division panels is determined to have an area substantially equal to that of one of the sub division panels.

In certain embodiments, each of the beads may be formed to have a downwardly curved concave shape. In certain embodiments, each of the beads may have a depth of 5 mm or more. In certain embodiments, the depth may be applied differently according to NVH performance. In certain embodiments, the perimeter of each of the beads can be formed as a rounded surface.

In certain embodiments, the panel with pattern block bead for a car body may be a center floor panel, rear floor panel, or dash panel.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
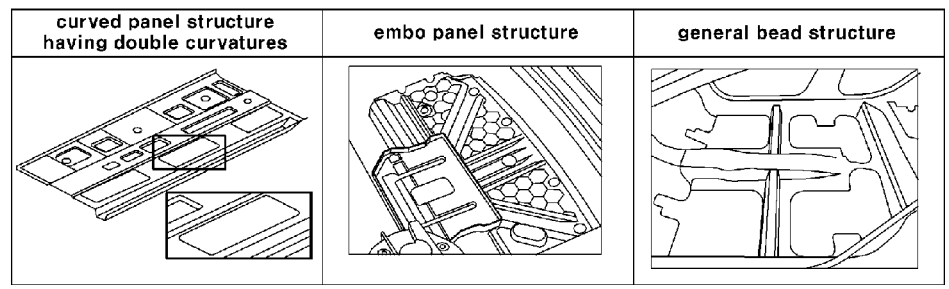
FIG. 1 is a perspective view of various conventional center floor panels.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several FIGS. of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a preferred embodiment of the present invention will be described in detail with reference to the accompanying drawings.

Figure 2:
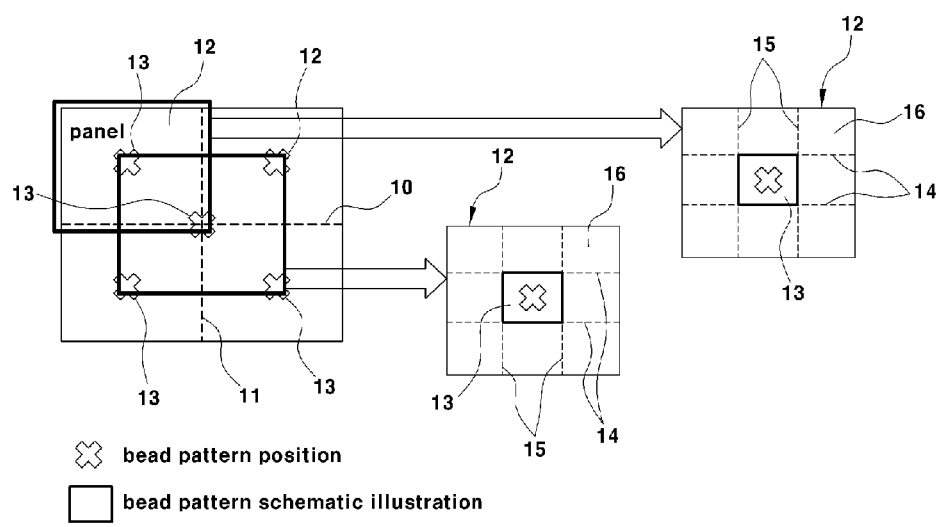
FIG. 2 is a schematic illustration of examples of choice of pattern shape and position in the panel with pattern block bead for car body according to an embodiment of the present invention.

FIG. 2 is a schematic illustration of examples of choice of pattern shape and position in the panel with pattern block bead for car body according to an embodiment of the present invention.

As shown in FIG. 2, the panel with pattern block bead for car body consists of a structure improving the NVH performance by applying an optimized shape to the center floor panel, and is capable of securing an excellent NVH performance not only in the low frequency area but also in the intermediate frequency area and the high frequency area.

In this panel for car body, for example, in the center floor panel, a position, shape and depth of bead pattern are important factors for the NVH performance.

By carrying out an optimization by applying a topography technique to seek for such major factors, panel shapes (bead patterns) can be embodied which have excellent performance in the entire frequency area.

For that purpose, a rectangular panel 100 selected to have an arbitrary size is divided into four division panels 12 having as reference lines a first substantially horizontal line 10 passing the center of up-down breadth of the panel and a first substantially vertical line 11 passing the center of left-right breadth of the panel. Although the first substantially vertical reference line 11 may be referred to as "vertical line 11," in certain embodiments, reference line 11 may cross the horizontal line 10 but may not be completely vertical.

The center of each division panel 12 obtained by such division, that is, a point of intersection where a horizontal line passing the center of up-down breadth (i.e. width) of the division panel and a vertical line passing the center of left-right breadth (i.e. length) of the division panel meet is set as a bead position, and at this position is formed a bead 13 having a predetermined size (area).

Furthermore, in certain embodiments, a position where the first horizontal line 10 and the first vertical line 11 intersect is set as a bead position too, and at this position is formed a bead 13 having a predetermined size (area).

Accordingly, in certain embodiments, one bead 13 is formed at each of the center of each division panel 12 obtained by dividing the panel 100 and the center of the panel 100, so that at one rectangular panel are formed a total of five beads 13.

In addition, in certain embodiments, the size of the bead 13 formed at each division panel 12 can be determined as follows:

Having as reference lines two parallel rows of second substantially horizontal reference lines 14 (also referred to herein as "sub horizontal lines 14") dividing equally the up-down breadth (width) of the division panel 12 into three parts and two parallel columns of second substantially vertical reference lines 15 (also referred to herein as "sub vertical lines 15") dividing equally the left-right breadth (length) of the division panel 12 into three parts, one division panel 12 is divided into nine sub division panels 16 arranged into a checkerboard form.

In certain embodiments, the size of the bead 13 can be determined to have an area equal to that of the sub division panel 16 obtained by such division.

That is, in certain embodiments, the size of the bead 13 can be determined by utilizing the size of the rectangular area of the center portion made when the two rows of sub horizontal lines 14 and the two columns of sub vertical lines 15 intersect.

This bead 13 can be formed to have a downwardly concave curved shape.

In addition, in certain embodiments, it may be preferable to form the edge portion of the bead 13, that is, the edge portion of the perimeter of the four sides as a rounded surface (reference number 17 in FIG. 4), so as to eliminate the degradation of the NVH performance in the intermediate frequency area and the high frequency area to further secure the NVH performance in the intermediate frequency area and the high frequency area. In certain embodiments, each of the beads may have rounded corners.

Furthermore, in certain embodiments, the bead 13 can have a depth of 5 mm or more so that the depth can be applied differently according to the NVH performance, for example to the frequency band.

Figure 3A:
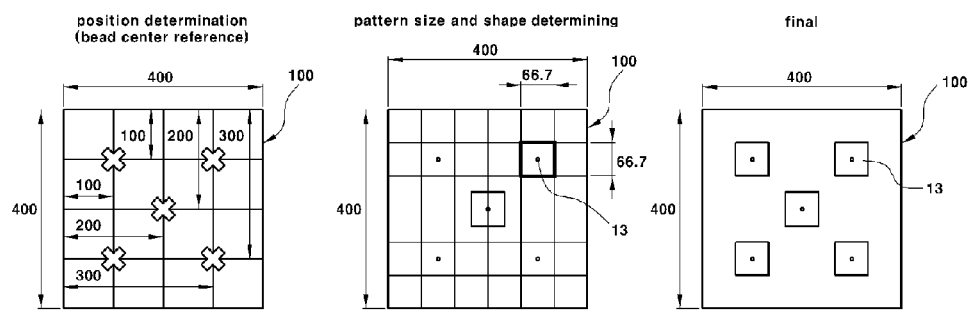
FIGS. 3a to 3c are schematic illustrations of examples of applying the panel with pattern block bead for car body according to embodiments of the present invention.
Figure 3B:
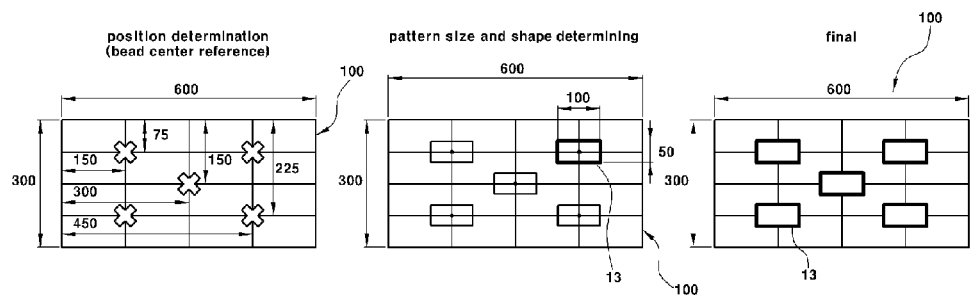
Figure 3C:
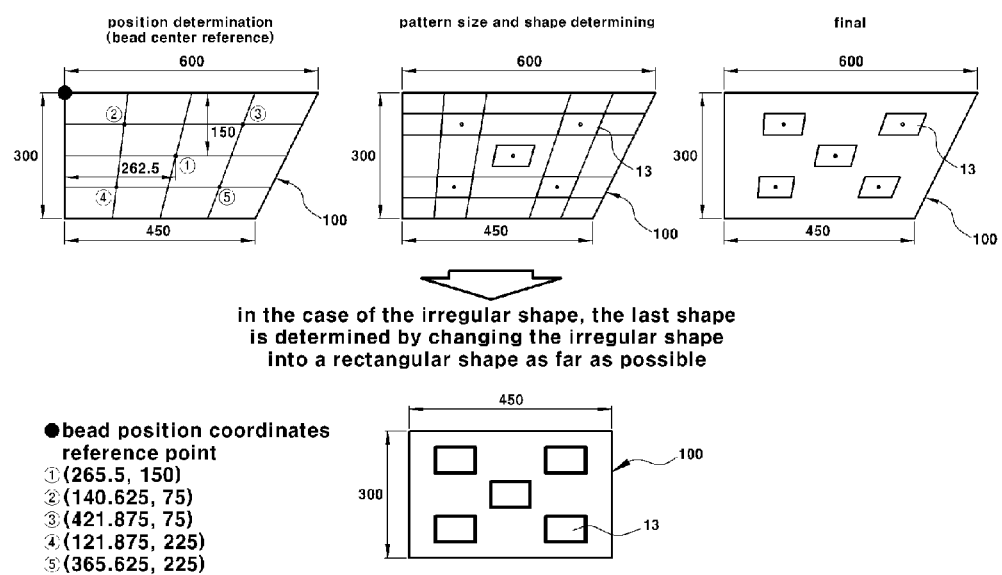

FIGS. 3a to 3c are schematic illustrations of examples of applying the panel with pattern block bead for car body according to an embodiment of the present invention.

As shown in FIG. 3a, an example of application of the beads 13 to a square panel or a zone (400 mm×400 mm) is shown.

A rectangular area of the panel 100 is divided by means of the first substantially horizontal reference line and the first substantially vertical reference line, and four bead forming positions are determined at the centers of division areas and one bead forming position is determined at the center of a rectangular area formed by the four bead forming positions.

In addition, the size of the bead 13 is determined to have a rectangular area obtained by dividing the divided area having one bead forming position by means of the sub horizontal lines and the sub vertical lines.

Therefore, at one panel 100 can be formed five beads 13 each having size of horizontal×vertical=66.7 mm×66.7 mm.

As shown in FIG. 3b, an example of application of the beads 13 to a rectangular panel or a zone (600 mm×300 mm) is shown.

The rectangular area of the panel 100 is divided by means of the first substantially horizontal reference line and the first substantially vertical reference line, and four bead forming positions are determined at the centers of division areas and one bead forming position is determined at the center of a rectangular area formed by the four bead forming positions.

In addition, the size of the bead 13 is determined to have a rectangular area obtained by dividing the divided area having one bead forming position by means of the sub horizontal lines and the sub vertical lines.

Therefore, at one panel 100 can be formed five beads 13 each having size of horizontal×vertical=100 mm×50 mm.

As shown in FIG. 3c, an example of application of the beads 13 to an irregular panel or a zone is shown.

A rectangular area of the panel 100 is divided by means of the first substantially horizontal reference line and the first substantially vertical reference line, and four bead forming positions are determined at the centers of division areas and one bead forming position is determined at the center of a rectangular area formed by the four bead forming positions.

Here, in the case of the irregular shape, the last panel shape is determined by changing the irregular shape into a rectangular shape as far as possible.

In addition, the size of the bead 13 is determined to have a substantially rectangular area obtained by dividing the divided area having one bead forming position by means of the sub horizontal lines and the sub vertical lines.

Therefore, at each bead position coordinates reference point of one panel 100 can be formed five beads 13 each having a substantially rectangular area.

Figure 4:
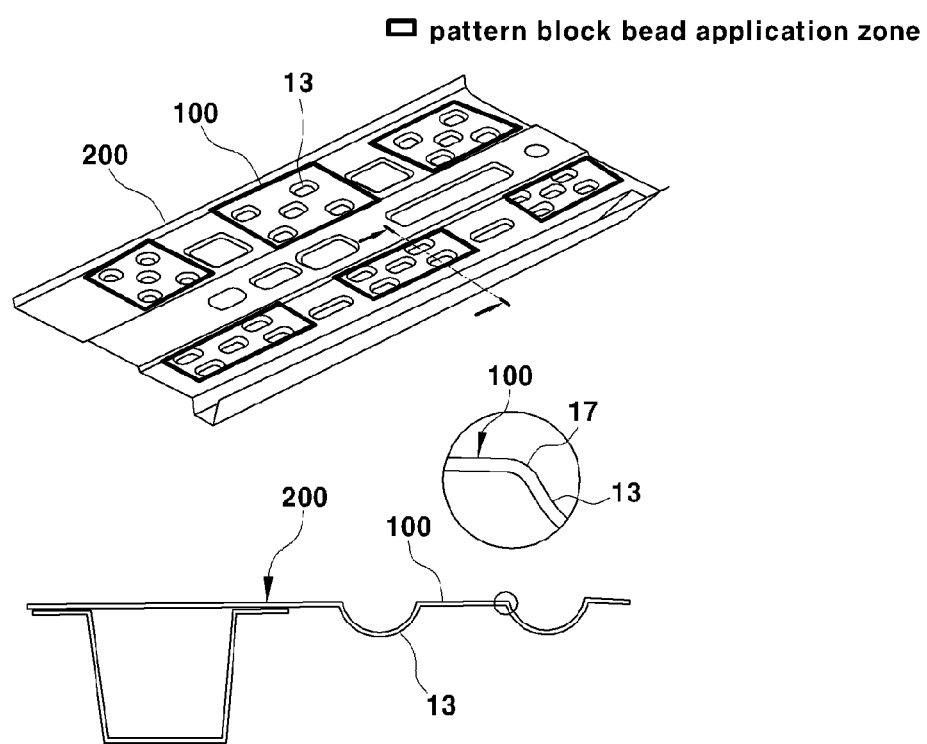
FIG. 4 shows a perspective view and a sectional view of the panel with pattern block bead for car body according to an embodiment of the present invention.

FIG. 4 shows a perspective view and a sectional view of the panel with pattern block bead for car body according to an embodiment of the present invention.

As shown in FIG. 4, the panel with pattern block bead for car body can be applied, in certain embodiments, to various panels such as a center floor panel, rear floor panel, and dash panel, and here is shown an example of application of the center floor panel 200.

That is, having as a reference a tunnel portion crossing the longitudinal direction at the center of breadth of the center floor panel 200, at one side panel are formed six panels, that is, six panels 100 applied with the pattern block beads, and at each panel 100 are formed five beads 13.

This center floor panel can reduce vibration reduction materials by improving a road noise and car noise performance, thereby seeking material saving as well as weight reduction.

The panel with pattern block bead for car body provided by the present invention has following advantages:

First, the present invention can improve a road noise and car noise performance, thereby reducing cost and weight.

For example, in the conventional center floor panel, an anti-pad was reinforced to have 4 mm thickness to improve the road noise and car noise performance, however, in the present invention, the thickness of the anti-pad can be reduced to 3 mm or 2 mm, thereby reducing the cost and weight.

Second, the center floor panel is a common part applied to various kinds of cars so as to further seek for ripple effects, and, furthermore, the panel of the present invention can be widely applied not only to the center floor panel but also to the rear floor panel, the dash panel, and the like.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A panel with pattern block bead for a car body comprising a plurality of beads,
   wherein the panel is divided into four division panels by a first substantially horizontal reference line and a first substantially vertical reference line each passing through a center of the panel,
   wherein one of the beads is formed at a center of each of the division panels,
   wherein another of the beads is formed at an intersection of the first substantially horizontal reference line and the first substantially vertical reference line,
   wherein one of the division panels is divided into nine sub division panels by two parallel second substantially horizontal reference lines dividing substantially equally a width of the division panel into three substantially horizontal sections and two parallel second substantially vertical reference lines dividing substantially equally a length of the division panel into three substantially vertical sections, and
   wherein a size of the one of the beads formed at the center of the one of the division panels is determined to have an area substantially equal to that of one of the sub division panels.

2. The panel with pattern block bead of claim 1, wherein each of the beads is formed to have a downwardly curved concave shape.

3. The panel with pattern block bead of claim 1, wherein each of the beads has a depth of 5 mm or more.

4. The panel with pattern block bead of claim 3, wherein the depth is applied differently according to a frequency band.

5. The panel with pattern block bead of claim 1, wherein the perimeter of each of the beads is formed as a rounded surface.

6. The panel with pattern block bead for of claim 1, wherein the panel is one of a center floor panel, rear floor panel, and dash panel.

* * * * *